(12) United States Patent
Cheng et al.

(10) Patent No.: US 12,436,770 B1
(45) Date of Patent: Oct. 7, 2025

(54) WINDOW-BASED CONTROL FOR INSTRUCTION ISSUE IN AN OUT-OF-ORDER PROCESSOR

(71) Applicant: SiFive, Inc., Santa Clara, CA (US)

(72) Inventors: I-Cheng Cheng, Zhubei (TW); Chen Wei, Taoyuan (TW); Kuan-Lin Huang, Taoyuan (TW); Yueh-Chi Wu, Taoyuan (TW)

(73) Assignee: SiFive, Inc., Santa Clara, CA (US)

( * ) Notice: Subject to any disclaimer, the term of this patent is extended or adjusted under 35 U.S.C. 154(b) by 0 days.

(21) Appl. No.: 18/742,968

(22) Filed: Jun. 13, 2024

(51) Int. Cl.
*G06F 9/38* (2018.01)
*G06F 9/30* (2018.01)

(52) U.S. Cl.
CPC ........ *G06F 9/3836* (2013.01); *G06F 9/30036* (2013.01); *G06F 9/30043* (2013.01)

(58) Field of Classification Search
CPC . G06F 9/3836; G06F 9/30043; G06F 9/30036
See application file for complete search history.

(56) References Cited

U.S. PATENT DOCUMENTS

| | | | | |
|---|---|---|---|---|
| 2007/0214343 | A1* | 9/2007 | Lindholm | G06F 9/3888 712/E9.055 |
| 2009/0113182 | A1* | 4/2009 | Abernathy | G06F 9/3013 712/216 |
| 2017/0060761 | A1* | 3/2017 | Guthrie | G06F 9/3824 |

* cited by examiner

*Primary Examiner* — William B Partridge
(74) *Attorney, Agent, or Firm* — Kilpatrick Townsend & Stockton LLP (57) ABSTRACT

A window-based constraint on issue order can be applied where a shared resource (e.g., a transfer buffer for load data) is allocated out-of-order by a first unit in a processor (e.g., a load/store unit) and freed in-order by a second unit in the processor (e.g., a unit that moves data out of the transfer buffer). The first unit can have a first issue queue and issue logic that imposes a constraint that an instruction that allocates the shared resource is only ready to issue if it is within or younger than a clearance window defined within the first issue queue, where the clearance window is defined to allow at least some out-of-order issue of instructions that allocate the shared resource.

20 Claims, 9 Drawing Sheets

WINDOW-BASED CONTROL FOR INSTRUCTION ISSUE IN AN OUT-OF-ORDER PROCESSOR

BACKGROUND

This disclosure relates generally to data flow in a processor and more specifically to window-based control for instruction issue in an out-of-order processor.

Processors are complex electronic circuits that are capable of executing sequences of instructions, also referred to as "programs." Programs are typically written as code in a high-level language that is human-readable, then compiled into a sequence of instructions in machine-readable code (also referred to as binary code). The processor executes the instructions by controlling active electronic components (e.g., transistors) within the processor to perform operations corresponding to the instructions, such as moving data from one storage location (including memory, registers, buffers, or any other type of storage location) to another, or performing arithmetic operations on data stored in registers in the processor. Processors typically include execution units capable of executing instructions, as well as control units that fetch instructions from memory, dispatch instructions to execution units, handle exceptions that may occur during execution, and so on.

The simplest processors implement a "scalar" that executes instructions in program order, one at a time or in a pipeline. More complex processors incorporate parallel processing techniques that increase computing power by allowing more operations to be executed concurrently in different parts of the processor. Examples of parallel processing techniques include superscalar cores, which can issue and execute multiple different instructions in parallel, and "vector" cores, which can execute the same instruction in parallel on multiple data elements. To further increase performance, some processors can issue and/or execute instructions out of order (that is, in an order different from the program code), with post-execution reordering logic to provide output that corresponds to the expected result from in-order execution. Parallelism can be further increased by providing a multi-core processor, which may include in-order cores, out-of-order cores, or a combination thereof. Different cores can be of like type or different types. For instance, a processor can include one or more scalar cores and one or more vector cores. Increasing parallelism in a processor can improve performance, with the tradeoff being increased complexity in the logic that manages the flow of instructions and data through the processor.

SUMMARY

In some processors, data may move between different "domains" within the processor. For instance, a processor may include a scalar processing core that exists in a scalar domain and a vector processing core that exists in a vector domain. The domains can operate largely independently of each other, with dedicated register files, execution units, instruction issue queues and so on. During execution of a program, different domains can execute different instructions, with data being passed between domains in accordance with the program instructions. For example, data can be loaded from memory into a scalar register file in a scalar domain or a vector register file in a vector domain. Savings in chip area and power can be realized by providing a load/store unit that is shared between the scalar and vector domains and that can execute loads and stores of both scalar and vector data. For instance, a vector load instruction (an instruction to load data from memory into a vector register in a vector register file) can be executed by first operating the load/store unit to retrieve vector data from memory and store the vector data in a vector transfer buffer, then operating a data transfer pipe in the vector domain to move the vector data from the vector transfer buffer into the vector register file.

According to some embodiments, issue logic in the load/store unit can implement window-constrained issue logic that determines whether vector load instructions are cleared to allocate space in the vector transfer buffer based on a "clearance window" (also sometimes referred to as a "window") defined within the load/store issue queue. The clearance window can be defined such that younger vector load instructions are blocked from being executed out of order if execution of the younger vector load instruction would prevent an oldest vector load instruction in the load/store issue queue from allocating space in the vector transfer buffer. As described below, the window-constrained issue logic can prevent certain deadlock situations while maintaining the increased efficiency associated with out-of-order execution of loads and stores.

According to some embodiments, a method in a processor can include: receiving, in a dispatch unit of a processor, a sequence of instructions having a program order, wherein at least some of the instructions are vector load instructions to load data from a memory system into a vector register file of the processor; dispatching the instructions from the dispatch unit to a plurality of issue queues in the processor, wherein dispatching the instructions includes dispatching each vector load instruction to a load/store issue queue of a load/store unit of the processor and to a vector issue queue in a vector domain of the processor; determining, by the load/store unit, whether each vector load instruction in the load/store issue queue is ready for issue, the determination including a constraint that the vector load instruction is within or younger than a clearance window defined within the load/store issue queue, wherein the clearance window is defined to allow at least some of the vector load instructions to be executed by the load/store unit out of the program order with respect to each other; executing, by the load/store unit, instructions from the load/store issue queue in an order different from the program order, wherein execution of the vector load instruction by the load/store unit occurs while the vector load instruction is ready for execution and wherein executing the vector load instruction by the load/store unit includes allocating a space in a vector transfer buffer and loading data from memory into the allocated space in the vector transfer buffer; and executing, in the vector domain of the processor, instructions from the vector issue queue in the program order, wherein execution of the vector load instruction in the vector domain includes transferring data from the allocated space in the vector transfer buffer to a destination register in the vector register file.

According to some embodiments, a processor can include: a vector domain including a vector issue queue, a vector data transfer pipe, and a vector register file, wherein the vector issue queue is configured to issue instructions in order; a load/store unit including a load/store issue queue, wherein the load/store issue queue is configured to issue instructions out of order; a vector transfer buffer configured to store vector data; a dispatch unit; and window-defining logic. The dispatch unit can be configured to receive a sequence of instructions having a program order, wherein at least some of the instructions are vector load instructions to load data from a memory system into a vector register file of the processor, and to dispatch the instructions to a plurality of issue queues in the processor, wherein dispatching the instructions includes dispatching each vector load instruction to the load/store issue queue and to the vector issue queue. The window-defining logic can be configured to define a clearance window in the load/store issue queue, wherein the clearance window is defined to allow at least some of the vector load instructions to be executed by the load/store unit out of the program order with respect to each other. The load/store unit can be configured such that executing a particular vector load instruction includes allocating space in the vector transfer buffer and loading vector data from a memory system into the allocated space in the vector transfer buffer. The the vector data transfer pipe can be configured such that executing the particular vector load instruction includes transferring the vector data from the allocated space in the vector transfer buffer to the vector register file. The load/store unit can further include window-constrained issue logic configured to determine whether each vector load instruction in the load/store issue queue is ready for issue, the determination including a constraint that the vector load instruction is within or younger than the clearance window.

In these and other embodiments, the clearance window can be further defined such that space in the vector transfer buffer is available for allocation by an oldest vector load instruction in the load/store issue queue.

In these and other embodiments, window logic in the processor can be used to determine window parameters that define the clearance window, the window parameters including a dynamically determined anchor point and a window size. For instance, the anchor point can be dynamically determined based on identifying a youngest instruction in the vector issue queue. As another example, the instructions can be arranged in a plurality of retirement groups according to the program order, and the anchor point can be dynamically determined based on identifying a youngest retirement group of instructions that includes a vector load instruction. In some embodiments, the window size can be a static parameter corresponding to a fixed number of retirement groups. As another example, the window size can be dynamically determined based at least in part on a length of a data vector, wherein the length of the data vector is a runtime-configurable parameter. As still another example, the window size can be dynamically determined dynamically based at least in part on estimating a density of vector load instructions in the sequence of instructions. As yet another example, the window size can be determined dynamically based at least in part on a current fill level of the vector transfer buffer.

In these and other embodiments, instructions in the load/store issue queue other than vector load instructions can be executed without regard to the clearance window.

According to some embodiments, a window-based constraint on issue order as described herein can be applied in a variety of situations where a shared resource (such as a transfer buffer between register renaming domains) is allocated out-of-order by a first unit in a processor and freed in-order by a second unit in the processor. The first unit can have a first issue queue from which instructions, including load instructions that, when executed, allocate the shared resource, are issued out of order. The second unit can have a second issue queue from which instructions, including load instructions that, when executed, free the shared resource, are issued in order. The first unit can have issue logic that determines which instructions in the first issue queue are ready to issue; the issue logic can impose a constraint that a load instruction is only ready to issue if it is within or younger than a clearance window defined within the first issue queue, where the clearance window is defined to allow at least some of the load instructions to be executed by the first unit out of the program order with respect to each other. (Other constraints can also be imposed, and being within or younger than the clearance window can be a necessary but not sufficient condition for the load instruction being ready to execute.)

The following detailed description, together with the accompanying drawings, will provide a better understanding of the nature and advantages of the claimed invention.

DETAILED DESCRIPTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

Processor Examples

Figure 1:
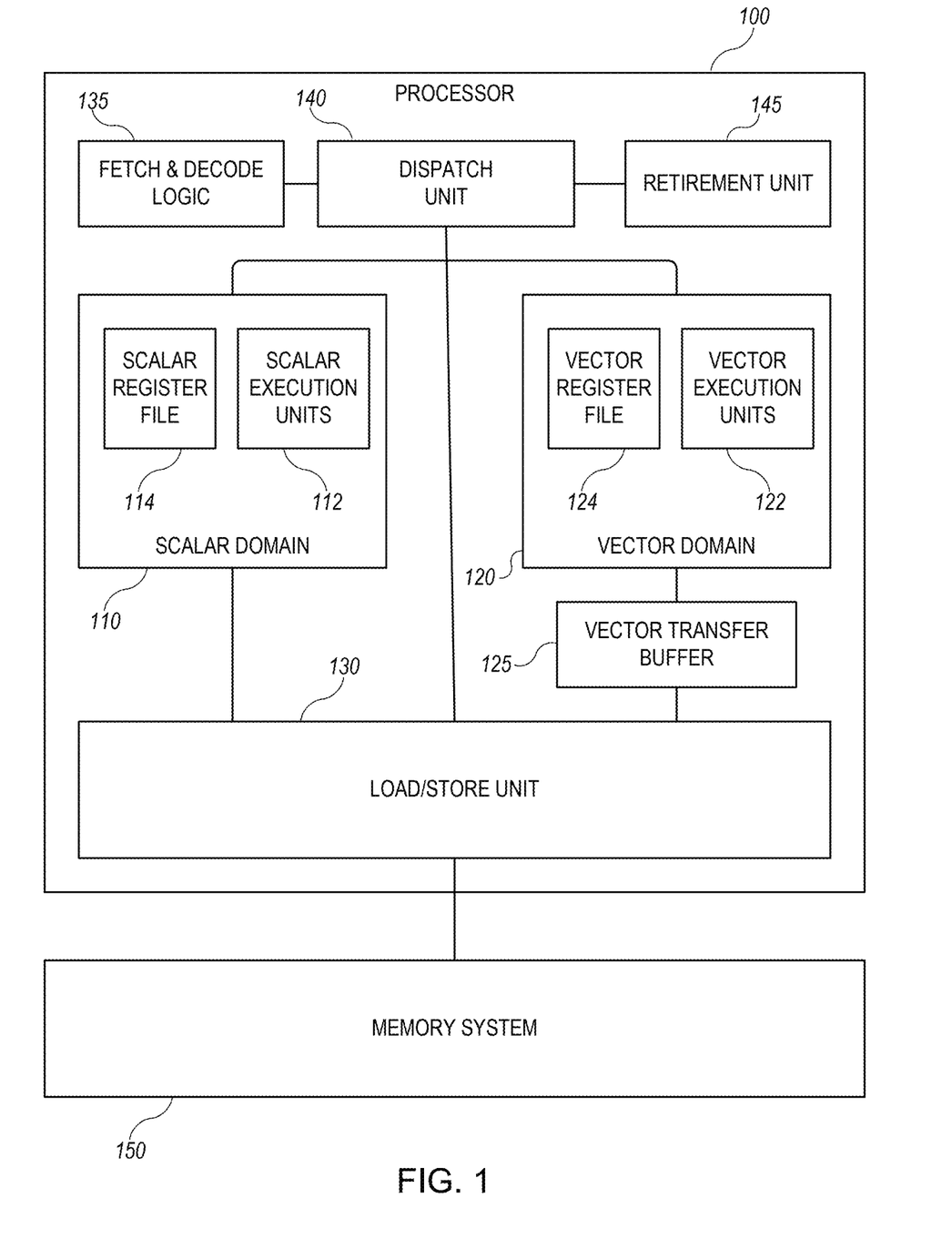
FIG. 1 shows a high-level block diagram of a processor according to some embodiments.

FIG. 1 shows a high-level block diagram of a processor 100 according to some embodiments. Processor 100 can be, for example, an integrated circuit that incorporates an arrangement of electronic circuits and components that can execute operations specified using binary code. Processor 100 can include a scalar domain 110 (which can be a scalar core, multiple scalar cores, or a portion of a scalar core) and a vector domain 120 (which can be a vector core, multiple vector cores, or a portion of a vector core). Scalar domain 110 includes one or more scalar execution units 112, which can include logic circuits configured to execute various scalar operations in response to instructions, and a scalar register file 114 to temporarily store scalar operands for scalar execution units 112 and results of scalar operations executed by scalar execution units 112. Vector domain 120 includes one or more vector execution units 122, which can include logic circuits configured to execute various vector operations in response to instructions, and a vector register file 124 to temporarily store vector operands for vector execution units 122 and results of vector operations executed by vector execution units 122. The particular implementation of scalar domain 110 and vector domain 120 can be varied without departing from the scope of this disclosure.

Memory system 150 can include any combination of memory circuits and/or memory devices capable of storing data. Components of memory system 150 can be located on the same chip as processor 100 and/or off-chip as desired. Examples of memory system components include random access memory (RAM, which can be implemented using a variety of circuits); read-only memory (ROM, which can also be implemented using a variety of circuits); and storage devices such as optical or magnetic disk drives, solid state drives, or other devices. Memory system 150 can incorporate a combination of different memory structures that have different capacities and characteristic access times. For example, memory system 150 can include a multi-level on-chip cache, backed by additional off-chip RAM circuits. In operation, memory system 150 can store data to be operated on by processor 100 and/or data produced by operation of processor 100. Memory system 150 can also store program instructions that specify sequences of operations to be performed.

To manage data transfers between processor 100 and memory system 150, processor 100 can include a load/store unit 130. In some embodiments, load/store unit 130 performs scalar data transfers between memory system 150 and scalar register file 114 and also performs vector data transfers between memory system 150 and vector register file 124, in response to load and store instructions. As used herein, a "load" operation refers to transferring data from memory system 150 to one of scalar register file 114 or vector register file 124, and a "store" operation refers to transferring data from one of scalar register file 114 or vector register file 124 to memory system 150. A vector transfer buffer 125 can be provided to facilitate data transfer between load/store unit 130 and vector domain 120. (Although not shown, a similar buffer can be provided between load/store unit 130 and scalar domain 110 if desired.)

Processor 100 can also include fetch and decode logic 135 to fetch program instructions from memory and decode the instructions (e.g., into micro-ops that control specific circuits within the processor). Decoded instructions ops are provided, in program order, to a dispatch unit 140 that dispatches the instructions to the particular components that can execute the instructions. For example, instructions for operating on scalar data can be dispatched to scalar domain 110, instructions for performing operating on vector data can be dispatched to vector domain 120, and load or store instructions can be dispatched to load/store unit 130. In some instances, an instruction may be dispatched to multiple units; examples are described below. It is contemplated that instructions in different units may be executed out of order with respect to each other and that some instructions may be executed speculatively (e.g., based on a branch prediction), and a retirement unit 145 can be provided to ensure that data output from processor 100 corresponds to the in-order result.

In operation, processor 100 can execute a program, or a sequence of instructions. As used herein, the terms "older" and "younger" are refer to the relative order of instructions in the sequence; older instructions occur earlier in the sequence than younger instructions. As noted above, processor 100 (or portions thereof) can execute instructions out of order (i.e., in any order different from the program order); that is, a younger instruction may be executed ahead of an older instruction. In some embodiments, each of scalar domain 110, vector domain 120, and load/store unit 130 receives dispatched instructions in order, with each unit receiving only the micro-ops it can execute. Different units can execute received instructions either in order or out of order as desired. For example, scalar domain 110 and load/store unit 130 may execute their received instructions out of order while vector domain 120 executes its received instructions in order. Other implementations are possible.

In some embodiments, program instructions are specified using a standard instruction set architecture (ISA), which defines a binary code format and expected behavior for each instruction that the processor can execute. For example, processor 100 may support a RISC-V ISA, including the base ISA (which defines scalar operations) and a vector extension (which defines vector operations). Decoding of the binary instructions into micro-ops can be specific to a particular processor implementation, and the same binary code can execute on different processors. In some instances, a single instruction may unroll into multiple micro-ops; an example is described below.

It will be appreciated that processor 100 is illustrative and that variations and modifications are possible. The particular combination of cores and execution units, as well as supported ISA, can be chosen as desired.

Vector Load/Store

Figure 2:
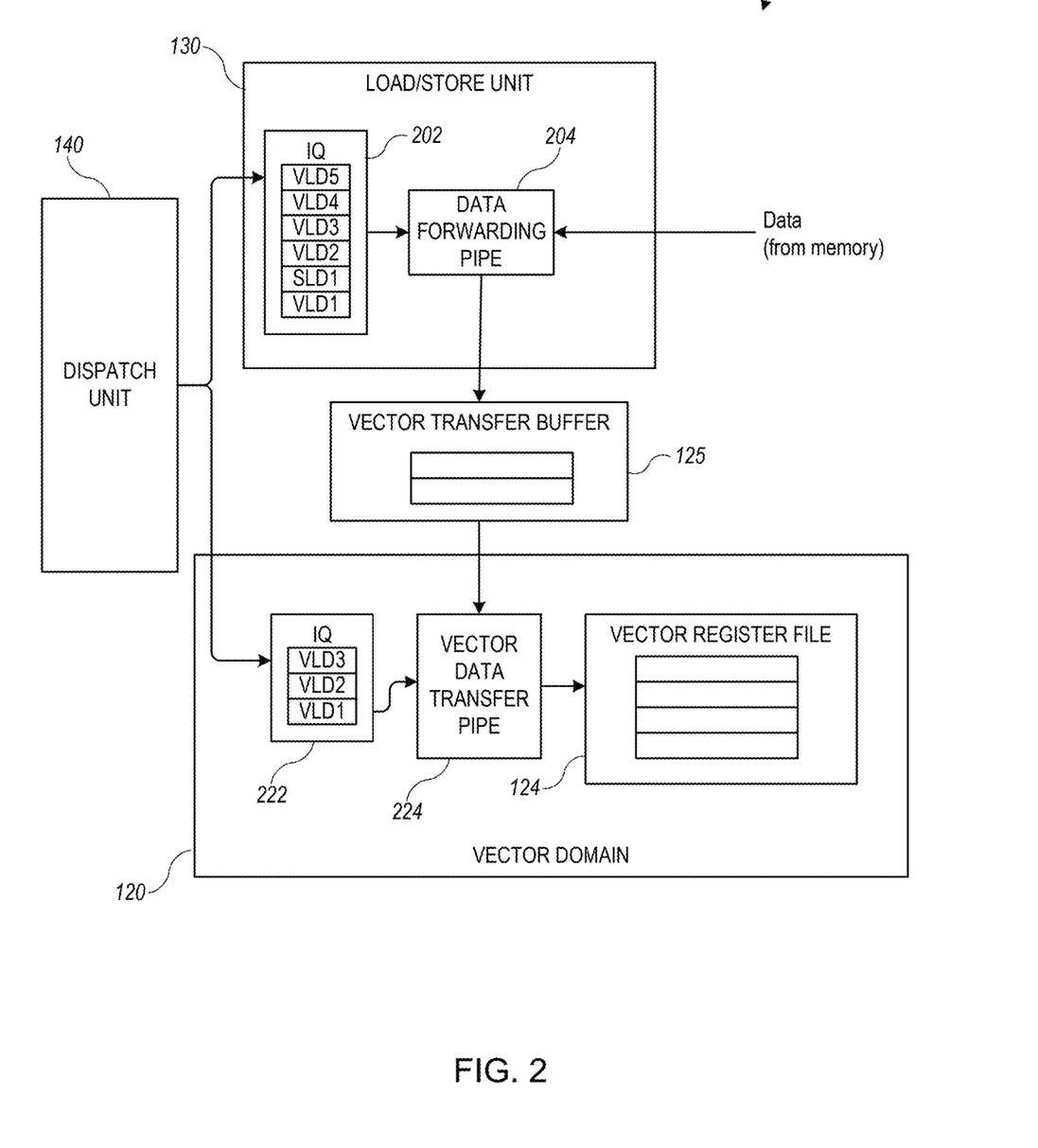
FIG. 2 shows a simplified block diagram of a portion of a processor according to some embodiments.

FIG. 2 shows a simplified block diagram of a portion of processor 100 according to some embodiments, illustrating a data path for vector load instructions. Shown in FIG. 2 are dispatch unit 140, load/store unit 130, and vector domain 120.

Load/store unit 130 can include a load/store issue queue 202 that receives load and store instructions in order from dispatch unit 140. At any given time, the instructions in load/store issue queue 202 can include any combination of vector load, vector store, scalar load, and scalar store. For a load operation, the instruction can specify the data source (e.g., an address for a location in memory system 150 of FIG. 1) and a destination (e.g., a register identifier in vector register file 124 for a vector load or in scalar register file 114 for a scalar load). Load/store unit 130 can issue (i.e., begin execution of) instructions from load/store issue queue 202 out of order. Those skilled in the art will appreciate that allowing load/store unit 130 to issue instructions out of order can improve efficiency of memory access and reduce idle processing cycles elsewhere in the processor (e.g., due to waiting for operands to be loaded from memory). As shown in FIG. 2, the execution logic in load/store unit 130 can include a data forwarding pipe 204. During execution of a vector load operation, data forwarding pipe 204 delivers data retrieved from memory to vector transfer buffer 125. In some embodiments, data forwarding pipe 204 can tag the data in vector transfer buffer 125 with the destination identifier specified in the instruction.

Vector domain 120 can include a vector issue queue 222 that receives instructions in order from dispatch unit 140 and a vector data transfer pipe 224. The received instructions can include vector load instructions, vector store instructions, instructions to operate on data in the vector register file, and so on. For a vector load, the received instruction can include an identifier of the destination register in vector register file 124. Vector data transfer pipe 224 can locate the data in vector transfer buffer 125 (e.g., by matching the destination register identifier to the tag applied by data forwarding pipe 204) and transfer the data from vector transfer buffer 125 to the appropriate register in vector register file 124. In some embodiments, vector domain 120 executes instructions from vector issue queue 222 in order (e.g., in vector execution units 122 as shown in FIG. 1).

Vector transfer buffer 125 provides short-term buffering of vector data between retrieval by load/store unit 130 and transfer into vector register file 124. Vector transfer buffer 125 can be regarded as a bridge between vector domain 120 and load/store unit 130. Vector transfer buffer 125 can be implemented similarly to a cache; for instance, each entry can have a tag, and associative lookup logic can be implemented to locate a particular data vector stored therein by reference to the tag. In some embodiments, there is not a one-to-one mapping between storage locations in vector transfer buffer 125 and registers in vector register file 124. For instance, vector register file 124 may have a larger capacity than vector transfer buffer 125. Further, it may be desirable for load/store unit 130 and vector domain 120 to operate as different register renaming domains, with vector domain 120 having its own register renaming logic that determines which physical register in vector register file 124 should be used to hold the data returned from a particular vector load instruction. Where this is the case, a destination identifier in the instruction provided to load/store unit 130 need not map directly to a specific physical register within vector register file 124.

In operation, dispatch unit 140 can receive a vector load instruction and can dispatch the vector load instruction to load/store issue queue 202 to vector issue queue 222. In some embodiments, the instruction is dispatched in the form of one or more micro-ops, and the micro-ops dispatched to load/store issue queue 202 and vector issue queue 222 can be but need not be identical to each other. In some embodiments, dispatch unit 140 is configured to dispatch instructions in order for a given issue queue but not necessarily across different issue queues. For instance, dispatch unit 140 can issue continue to issue younger instructions to load/store issue queue 202 when vector issue queue 222 is full, provided that load/store issue queue 202 is not also full. Accordingly, a given vector load instruction might or might not be dispatched issued to load/store issue queue 202 and vector issue queue 222 in the same cycle.

In some embodiments, a single vector load instruction can unroll into multiple instructions or micro-ops, e.g., during decoding. For example, the RISC-V vector extension allows multiple physical registers in a vector register file (such as vector register file 124) to be logically concatenated such that the registers are treated as a single larger vector register. More specifically, the RISC-V vector extension defines a run-time configurable parameter "LMUL," whose value indicates the number of vector registers to be concatenated for each vector operand. LMUL can have one of several values (the current RISC-V specification provides LMUL values of 1, 2, 4, or 8). Assuming that each vector load instruction executed by load/store unit 130 retrieves data for only one vector register, a RISC-V compliant implementation of a vector load instruction can include unrolling the vector load instruction into a number LMUL of micro-ops, each of which can be dispatched as a separate instruction to load/store issue queue 202. In such implementations, load/store unit 130 can be agnostic to the value of LMUL. (Similar considerations apply to other RISC-V vector instructions, including vector store instructions.)

In this example, load/store unit 130 also executes scalar loads and stores, and load/store issue queue 202 can include scalar load and/or scalar store instructions in addition to vector load and/or vector store instructions. Scalar load/store instructions are not dispatched to vector issue queue 222. (Depending on implementation, scalar load/store instructions may be dispatched to a scalar issue queue.)

To execute a vector load instruction from load/store issue queue 202, load/store unit 130 allocates space in vector transfer buffer 125 and performs a memory read access to retrieve the data from memory system 150. Data forwarding pipe 204 receives the data from memory system 150 and loads the data into the allocated space in vector transfer buffer 125.

To execute the vector load instruction from vector issue queue 222, vector data transfer pipe 224 waits until the data is ready in vector transfer buffer 125 (which occurs once data forwarding pipe 204 has loaded the data), then transfers the data from vector transfer buffer 125 to the destination register in vector register file 124 and frees the space in vector transfer buffer 125. In various embodiments, the instructions provided to load/store unit 130 and vector domain 120 can include a shared tag (which can be an identifier of a destination register or an arbitrary tag). When data forwarding pipe 204 loads data into a particular location in vector transfer buffer 125, data forwarding pipe 204 can associate the shared tag with that location. Vector data transfer pipe 224 can determine when data is ready and retrieve the correct data by reference to the shared tag. Once the data is retrieved, vector data transfer pipe 224 can free the allocated space in vector transfer buffer 125 for use by a subsequently-executed instruction (e.g., another vector load).

In some embodiments, vector data transfer pipe 224 executes load and store instructions from vector issue queue 222 in order. When a particular vector load instruction becomes the oldest instruction in vector issue queue 222, vector data transfer pipe 224 waits for the data to be ready in vector transfer buffer 125, then performs the data transfer into vector register file 124.

Given that filling of vector transfer buffer 125 can occur out of order (e.g., data for a younger vector load can enter vector transfer buffer 125 ahead of data for an older vector load) while emptying of vector transfer buffer 125 occurs in order, there is a potential for deadlock. For example, consider the instruction sequence VLD1, VLD2, VLD3, VLD4, VLD5 (where "VLD" denotes a vector load, and the number indicates the relative program order). Depending in part on the respective capacities of load/store issue queue 202, vector issue queue 222, and vector transfer buffer 125, it is possible that data associated with younger vector load instructions, such as VLD4 and VLD5, could fill up vector transfer buffer 125 before an older vector load instruction such as VLD1 is executed by load/store unit 130. In this scenario, load/store unit 130 would be unable to allocate space in vector transfer buffer 125 to execute VLD1 until vector data transfer pipe 224 removes some data from vector transfer buffer 125, but vector data transfer pipe 224 would be waiting for the data for VLD1 (the oldest instruction in vector issue queue 222) and therefore unable to free any space in vector transfer buffer 125. Such deadlock scenarios may trigger recovery actions, such as various combinations of replay, refetch, or restart, any of which can introduce considerable inefficiency. Therefore, it is preferable to avoid deadlock.

In theory, a sufficiently large vector transfer buffer 125 could avoid deadlock in most or all scenarios. However, this is inefficient in terms of chip area and may also introduce processing overhead. Another option would be to constrain load/store unit 130 to execute vector loads in order, but this introduces inefficiencies in the memory access and can lead to idle cycles in the vector domain.

Window-Constrained Issue Logic

According to some embodiments, deadlock can be avoided without limiting the load/store unit to in-order execution. For example, a load/store unit can implement window-constrained issue logic that determines whether vector load instructions are cleared to allocate space in the vector transfer buffer based on a "clearance window" (also just referred to as a "window") defined within the load/store issue queue. The clearance window can be defined such that younger vector load instructions are blocked from being executed out of order if execution of the younger vector load instruction would prevent an oldest vector load instruction in the load/store issue queue from allocating space in the vector transfer buffer.)

Figure 3:
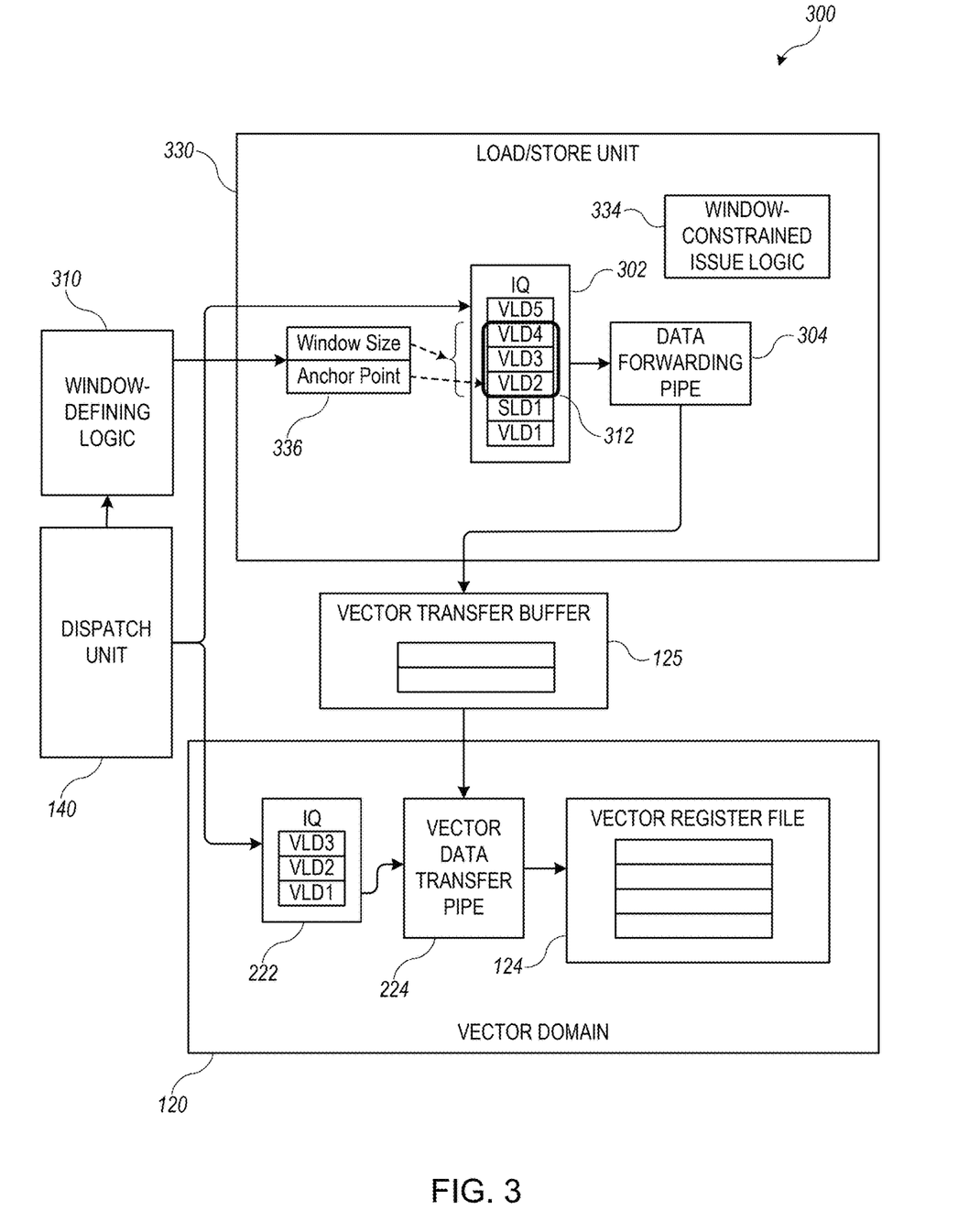
FIG. 3 shows a simplified block diagram of a portion of a processor according to some embodiments.

FIG. 3 shows a simplified block diagram of a portion of processor 300 with window-constrained issue logic in the load/store unit according to some embodiments, illustrating a data path for vector load instructions. Shown in FIG. 3 are dispatch unit 140, load/store unit 330, and vector domain 120, which can be similar to components described above. Processor 300 also includes window-defining logic 310, which can monitor the (in-order) instruction stream and define a clearance window 312 within load/store issue queue 302 of load/store unit 330. As described in more detail below, clearance window 312 can be defined by an anchor point (corresponding to a particular instruction that is present in load/store issue queue 202) and a window size. Like load/store unit 130 described above, load/store unit 330 can execute micro-ops from load/store issue queue 302 out of order; any instruction that is ready can be executed. Load/store unit 330 can include window-constrained issue logic 334 that determines when an instruction is ready to issue using decision logic that blocks issue of any vector load instructions that are younger than the youngest micro-op in clearance window 312. Any vector load instruction that is in clearance window 312, as well as any vector load instruction that is older than the oldest instruction in clearance window 312 can be selected for execution in any order. In some embodiments, clearance window 312 constrains execution order only for vector load instructions; a vector store instruction or any scalar load or store instruction can be executed even if it is younger than the youngest instruction in clearance window 312.

Clearance window 312 can be advantageously defined to allow flexibility in the execution order of vector load instructions while ensuring that space is always available in vector transfer buffer 125 to be allocated by the oldest vector load instruction in load/store issue queue 302. As a result, vector domain 120 does not stall due to being unable to execute the oldest instruction in vector issue queue 222.

Like other aspects or components of issue logic in a processor, window-defining logic 310 is advantageously implemented in hardware and can operate in each processor cycle to update clearance window 312. For instance, window-defining logic 310 can store the window parameters in control and status registers 336 in load/store unit 330 that can be read by window-constrained issue logic 334.

A number of different techniques can be implemented to define clearance window 312. As noted above, one definition can be based on an anchor point (or anchor instruction) and a window size (e.g., in number of instructions). The anchor point can be defined dynamically as instructions are executed and need not be the oldest instruction, or even the oldest vector load instruction, in load/store issue queue 302. The window size can be fixed or dynamic, depending on implementation. Specific examples of logic for defining an anchor point and for defining a window size will now be described. It should be understood that different implementations of logic for defining anchor point can be used with different implementations of logic for defining window size.

Figure 4:
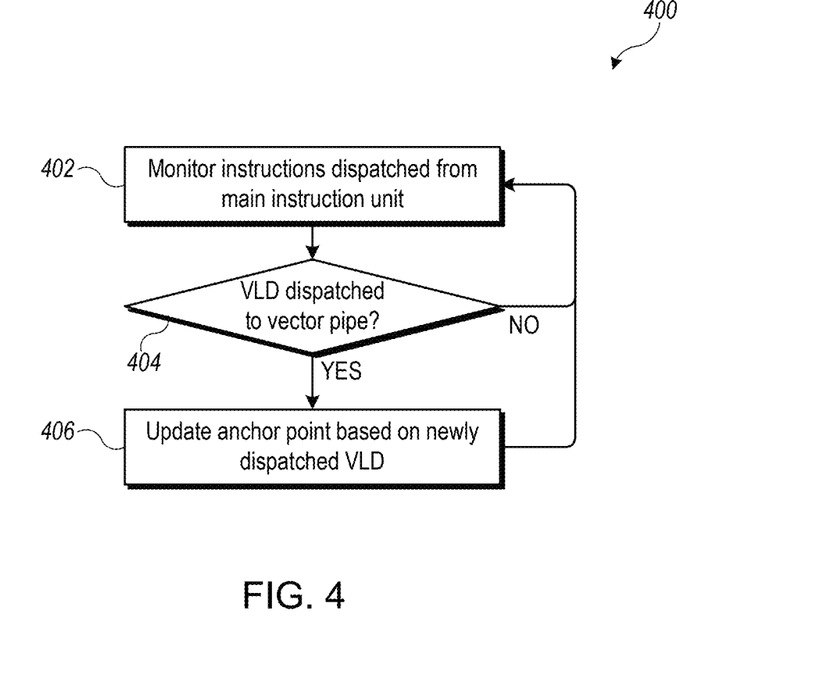
FIG. 4 shows a flow diagram of a process that can be implemented in window-defining logic according to some embodiments.

In some embodiments, window-defining logic 310 can determine when to update the anchor point by monitoring the instructions that are dispatched into vector issue queue 222 by dispatch unit 140. Window-defining logic 310 can update the anchor point when a new vector load instruction is dispatched into vector issue queue 222. FIG. 4 shows a flow diagram of a process 400 that can be implemented in window-defining logic 310 according to some embodiments. At block 402, window-defining logic 310 monitors the instructions dispatched from dispatch unit 140 to detect a vector load (VLD) instruction dispatched to vector issue queue 222. If, at block 404, dispatch of a vector load instruction is detected, then at block 406, window-defining logic 310 updates the anchor point based on the newly dispatched vector load instruction. In some embodiments, every vector load instruction is dispatched to vector issue queue 222 and to load/store issue queue 302. The anchor point can be set to the vector load instruction in load/store issue queue 302 that corresponds to the vector load instruction that was newly dispatched to vector issue queue 222. Process 400 can be performed in a continuous loop (e.g., once per cycle of dispatch unit 140).

Figure 5:
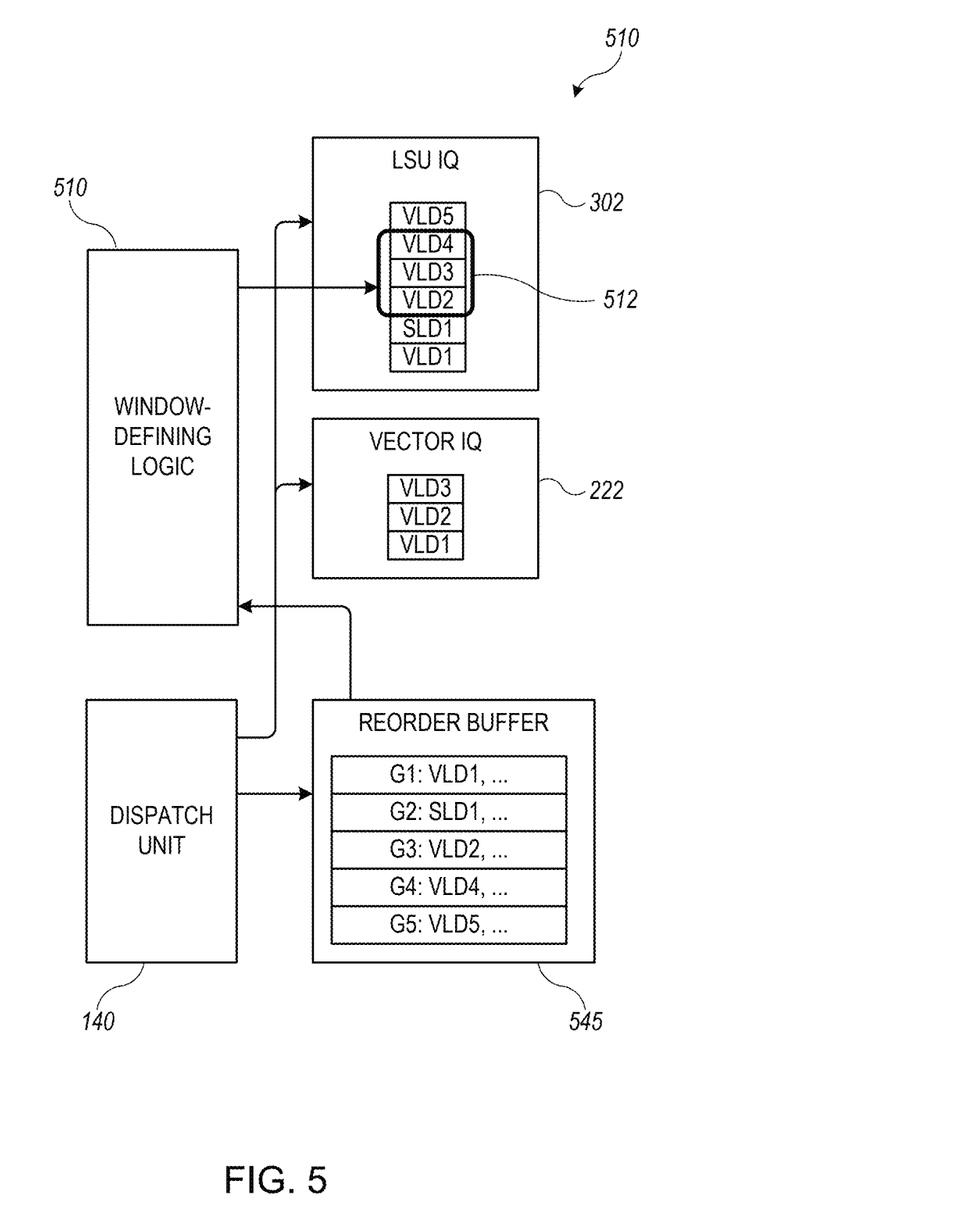
FIG. 5 shows a simplified block diagram of a portion of a processor according to some embodiments.

In some embodiments, the window logic can determine when to update the anchor point by monitoring a reorder buffer of the processor. FIG. 5 shows a simplified block diagram of a portion of a processor 500 according to some embodiments. Processor 500 can be generally similar to other processors described herein and can include a dispatch unit 140, a vector domain having a vector issue queue 222, and a load/store unit having a load/store issue queue 302 as described above. Processor 500 can also include a reorder buffer 545. Reorder buffer 545 can maintain a list of instructions, in program order, for purposes of managing retirement of instructions following their execution. In some embodiments, dispatch unit 140 can send instructions (or micro-ops) to reorder buffer 545 concurrently with dispatch to the issue queues, enabling reorder buffer 545 to maintain an in-order list of instructions.

Reorder buffer 545 can arrange instructions into "retirement groups," where each retirement group includes one or more sequential instructions that can be concurrently retired. The size of retirement groups can vary from one group to the next. For instance, in some embodiments a new retirement group is started for any instruction that is capable of generating an exception. Assuming that vector load is one such instruction, each retirement group will have at most one vector load instruction, and if there is a vector load instruction in a retirement group, the vector load instruction will be the first instruction in the retirement group.

Figure 6:
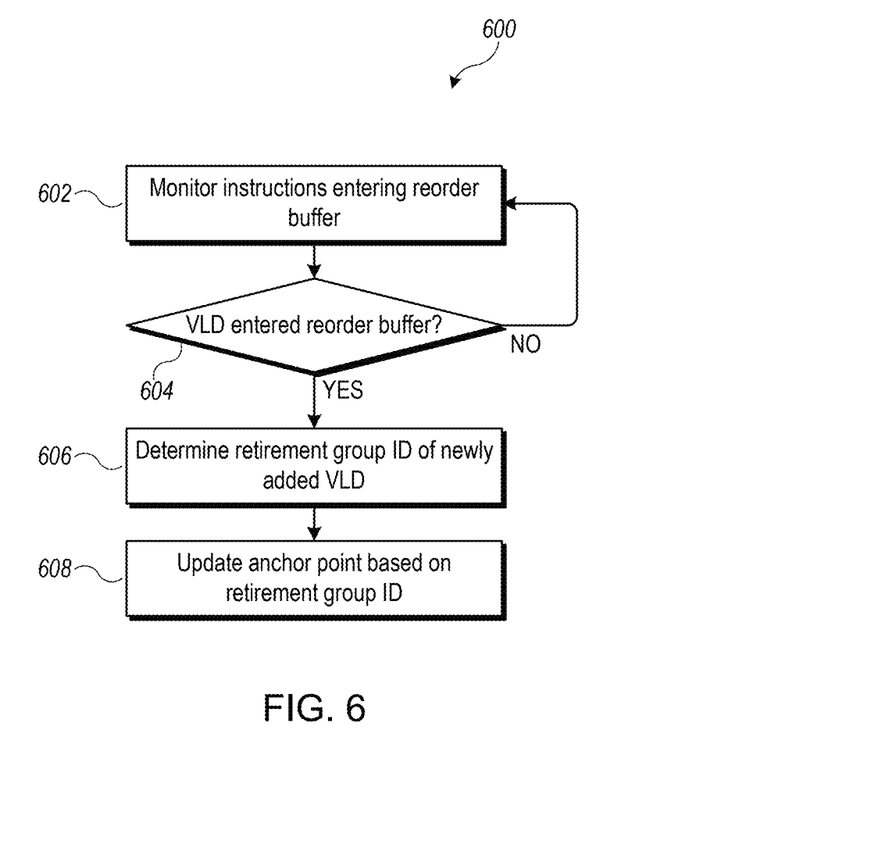
FIG. 6 shows a flow diagram of a process that can be implemented in window-defining logic according to some embodiments.

Window-defining logic 510 can use the retirement groups in reorder buffer 545 to identify and update an anchor point for a clearance window 512. FIG. 6 shows a flow diagram of a process 600 that can be implemented in window-defining logic 510 according to some embodiments. At block 602, window-defining logic 510 monitors instructions entering reorder buffer 545 to detect a vector load (VLD) instruction. If, at block 604, a new vector load instruction is detected, then at block 606, window-defining logic 510 can obtain from reorder buffer 545 a retirement group identifier associated with the new vector load instruction. At block 608, the retirement group identifier can be used to update the anchor point for clearance window 512.

An anchor point defined using process 400 or process 600 or any other process can represent an oldest instruction in a window such as clearance window 312 or clearance window 512. It should be noted that the anchor point need not correspond to the oldest instruction (or the oldest vector load instruction) in load/store issue queue. Allowing the anchor point to be younger can expand the possibilities for out-of-order execution.

As shown in FIG. 3, clearance window 312 can extend from the anchor point in the direction of younger instructions for a particular number of instructions, with the particular number being specified as the window size. In various embodiments, window size can be optimized to allow out-of-order execution of younger vector load instructions while preventing deadlock by ensuring that the oldest vector load instruction will be able to allocate space in the vector transfer buffer when it is ready to execute. Depending on implementation, the window size can be fixed or dynamic.

One option is to define the window size as a fixed number of instructions in load/store issue queue 302, e.g., 24 instructions or some other number. Window size can be optimized empirically by simulating execution of a number of different processor benchmarking programs and repeating the simulation with different window sizes. (Those skilled in the art will be familiar with examples of suitable programs and processor simulation techniques.) However, it is generally the case that the density of vector load instructions within the program code depends on the particular program being executed; for instance, in a particular program or segment thereof, there may be more or fewer vector loads relative to other types of load and/or store instructions. Where the density of vector load instructions is higher (lower), a smaller (larger) window size may be preferred, and it may be difficult to find a single window size parameter that is optimal across a range of benchmarks. Performance tradeoffs can be used to choose a fixed number of instructions for the window size.

Another option is to define the window size as a fixed number of retirement groups, rather than a fixed number of instructions. As described above with reference to reorder buffer 545, each retirement group includes either zero or one vector load instruction. Accordingly, a fixed number of retirement groups can be an acceptable proxy for density of vector load instructions in the program code. Similarly to defining a window size as a fixed number of instructions, the number of retirement groups can be optimized using simulation studies and taking into account performance tradeoffs.

In some embodiments, the window size can be defined dynamically. For instance, the density of vector load instructions in the binary code (or a portion thereof) can be estimated, e.g., by implementing logic at the fetch and decode stages to count vector loads and other load/store instructions. A default window size can be defined for the processor, and as programs are executed, the default window size can be increased or decreased as appropriate based on a dynamic estimate of the density of vector load instructions.

In addition or instead, the window size can be determined based at least in part on the LMUL parameter. As noted above, LMUL is a runtime-configurable parameter that defines the number of vector registers per vector. A single vector load instruction in the binary code may unroll to a number LMUL of vector load micro-ops in load/store issue queue 302, each of which is treated (at least by load/store unit 330) as a separate vector load instruction that loads data for one vector register. Thus, a higher value of LMUL implies an increased density of vector load instructions. Accordingly, the window size can be a function of LMUL, with window size increasing for small LMUL and decreasing for large LMUL. (Similar logic can also be applied in other implementations where the amount of space required to store a vector is a runtime-configurable parameter.)

In addition or instead, the window size can be dynamically adjusted based at least in part on the current fill level of vector transfer buffer 125. For instance, window-defining logic such as window-defining logic 310 or window-defining logic 510 can determine a current fill level for vector transfer buffer 125. The fill level can be defined as the number of entries in vector transfer buffer 125 that are currently allocated (regardless of whether the data has been received). The fill level can be thought of as a fraction; however, assuming that vector transfer buffer 125 has a fixed size, the denominator of the fraction is constant and the number of allocated entries suffices. If the fill level drops below a low threshold (e.g., corresponding to 30% or 20% of the size of vector transfer buffer 125), the window-defining logic can increase the window size, and if the fill level exceeds a high threshold (e.g., corresponding to 70% or 80% of the size of vector transfer buffer 125), the window-defining logic can decrease the window size.

Any of the above techniques or other techniques, or a combination thereof, can be used to define an anchor point and window size, and any technique for defining window size can be combined with any technique for defining the anchor point. For instance, an anchor point defined based on dispatch of instructions to the vector issue queue can be used in combination with a window size defined statically by number of retirement groups or dynamically based on fill level of vector transfer buffer 125. Other combinations can also be used.

Figure 7:
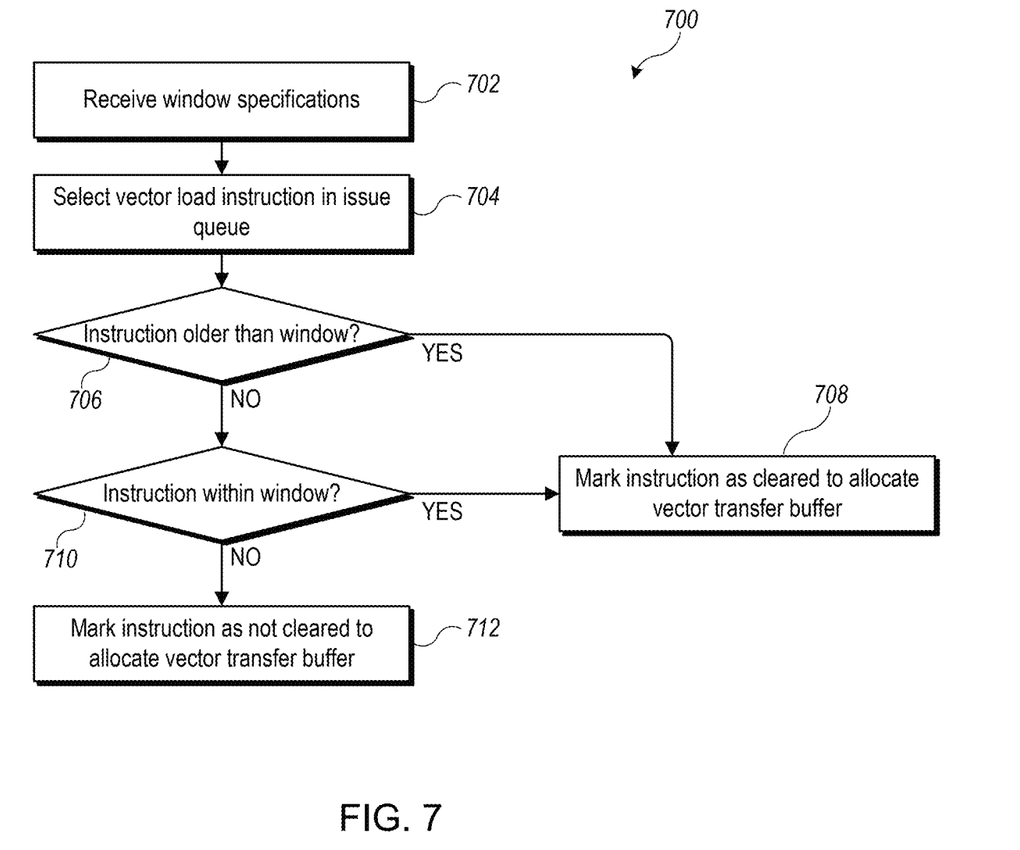
FIG. 7 shows a flow diagram of a process for managing a load/store issue queue according to some embodiments.

Given an anchor point and a window size and anchor point, window-constrained issue logic 334 can constrain out-of-order issue of vector load instructions. FIG. 7 shows a flow diagram of a process 700 that can be implemented in window-constrained issue logic 334 of load/store unit 330 according to some embodiments. Window-constrained issue logic 334 can incorporate tracking of which instructions in load/store issue queue 302 are ready for issue. Window-constrained issue logic 334 can, for example, detect data hazards (e.g., read after write or write after read to the same memory location) and/or unavailability of other resources that may be needed for instruction execution, such as space in vector transfer buffer 125, and can mark instructions in load/store issue queue 302 as cleared or not cleared with respect to particular constraints. An instruction can be considered ready to issue when all constraints have been cleared. Process 700 can be incorporated into window-constrained issue logic 334 to constrain (and thereby block) vector load instructions younger than the youngest instruction in clearance window 312 from issuing.

At block 702, process 700 can receive window specifications, e.g., by reading window parameters from control and status registers written by window-defining logic 310 (or window-defining logic 510 or other window-defining logic). The window parameters can include, e.g., an anchor point and a window size as described above. At block 704, process 700 can select a vector load instruction in load/store issue queue 302. At decision block 706, process 700 can determine whether the vector load instruction is older than an oldest instruction in clearance window 312 (e.g., older than the anchor point). If so, then at block 708, the vector load instruction can be marked as cleared to allocate space in vector transfer buffer 125, and process 700 does not block the vector load instruction from being issued. If, at decision block 706, the vector load instruction is not older than the oldest instruction in the clearance window, then at block 710, process 700 can determine whether the vector load instruction is within the window (e.g., based on the anchor point and window size). If so, then at block 708, the vector load instruction can marked as cleared to allocate space in vector transfer buffer 125, and process 700 does not block the vector load instruction from being issued. If, at block 710, the vector load instruction is not within the window (meaning that the vector load instruction is younger than the youngest instruction in the window), then at block 712, process 700 can block the vector load instruction from allocating space in vector transfer buffer 125, and the vector load instruction cannot issue.

Process 700 can be repeated on every cycle to update the clearance status of vector load instructions. It should be understood that an instruction that is cleared by process 700 to allocate space in vector transfer buffer 125 during a particular cycle does not necessarily allocate space or issue during that cycle. For instance, there may be other constraints (e.g., data hazards, memory bank conflicts or the like) that prevent issuing a vector load instruction that is within or older than the window. If an older vector load instruction is blocked by some constraint other than the clearance window, younger vector load instructions that are not blocked by the clearance window or any other constraint can be issued out of order.

Process 700 is illustrative of a variety of logic processes that can be applied to constrain the number of vector load instructions that are cleared to allocate space in a vector transfer buffer without otherwise constraining out-of-order execution of loads and stores. It should be understood that process 700 or similar process can be selectively applied to vector load instructions; any instructions in load/store issue queue 302 that are not vector load instructions can be allowed to issue even if they are younger than the youngest instruction in clearance window 312.

Figure 8:
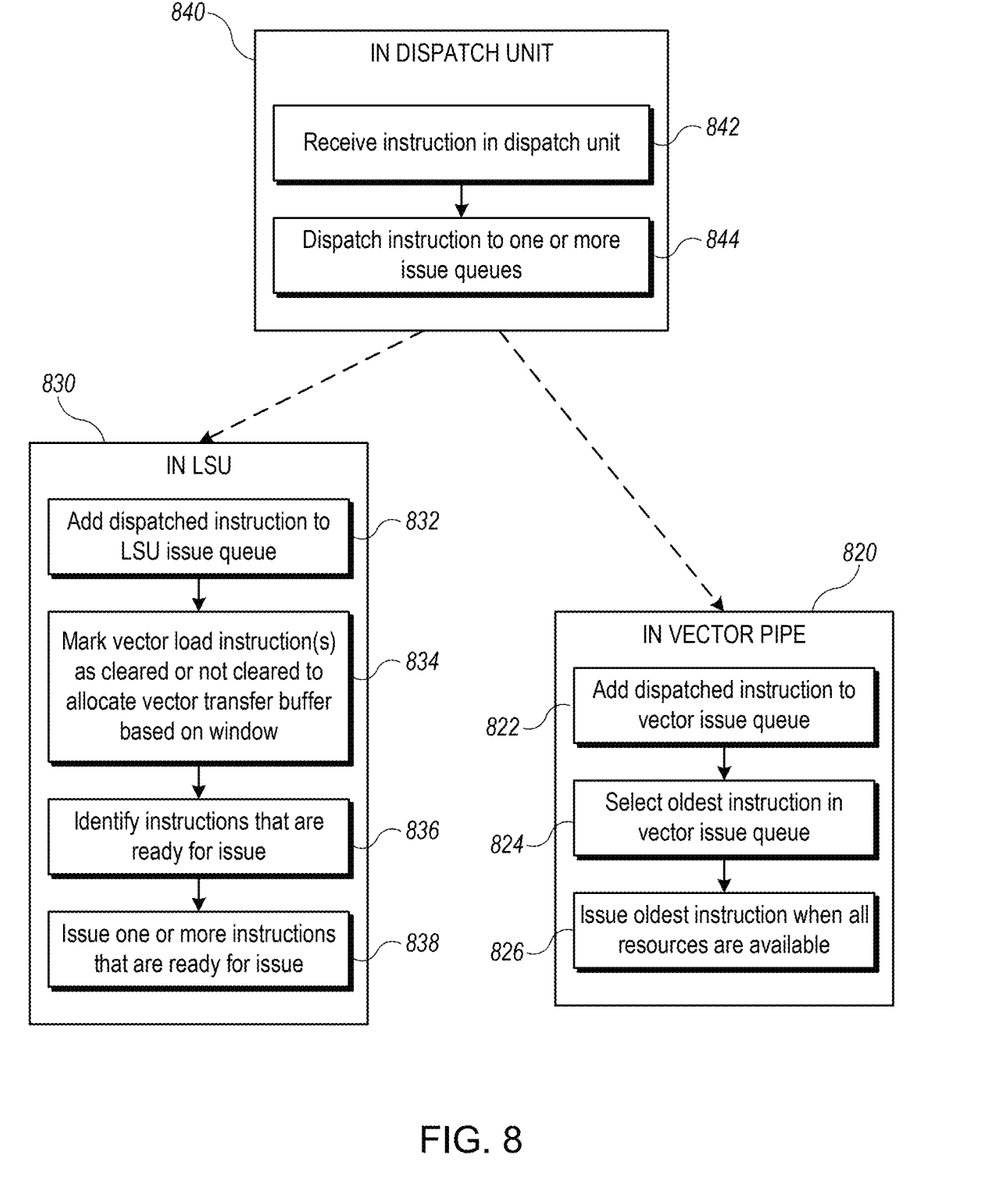
FIG. 8 shows a flow diagram of a process that includes processing in various units within a processor according to some embodiments.

Further illustrating effects of a clearance window on the instruction flow, FIG. 8 shows a flow diagram of a process 800 that includes processing in a dispatch unit (processing block 840), a load/store unit (processing block 830), and a vector pipe (processing block 820) of a processor according to some embodiments. Processing block 840 can be implemented, e.g., in dispatch unit 140 described above. Processing block 830 can be implemented, e.g., in load/store unit 330 described above. Processing block 820 can be implemented, e.g., in vector domain 120 described above. It should be understood that processing blocks 840, 830, and 820 can be performed concurrently in different logic circuits within the processor, with a given vector load instruction flowing through the processing blocks.

Processing block 840 can include receiving an instruction in a dispatch unit (e.g., dispatch unit 140) at block 842. As described above, dispatch unit 140 can receive instructions in program order. At block 844, dispatch unit 140 can dispatch the instruction to one or more issue queues in different processing units that are configured to execute the instruction. (The processing units can include cores, domains, or other processor components that have issue queues.) Instructions of different types can be dispatched to different processing units. In this example, vector load instructions are dispatched to load/store unit 330 and to vector domain 120. Dispatch of an instruction to a particular processing unit can occur when space is available in the issue queue of that processing unit. In some embodiments, dispatch to different processing units can occur out of order, in the sense that where a younger instruction and an older instruction are to be dispatched to different processing units, the younger instruction can be dispatched ahead of the older instruction, as long as each processing unit receives its instructions in order. Where the same instruction is dispatched to multiple processing units (e.g., a vector load, which is dispatched to load/store unit 330 and vector domain 120), dispatch to different processing units can occur in the same cycle or in different cycles. For example, if load/store unit 330 has space in its issue queue while vector domain 120 does not, a vector load instruction can be dispatched to load/store unit 330 in one cycle and to vector domain 120 in a later cycle when space becomes available in the vector issue queue. In some embodiments, dispatch unit 140 can dispatch multiple instructions per cycle.

Processing block 830 can include adding a dispatched instruction to load/store issue queue 302 in load/store unit 330 at block 832. At block 834, for each vector load instruction in load/store issue queue 302, window-constrained issue logic 334 in load/store unit 330 can mark the vector load instruction as either cleared or not cleared to allocate space in vector transfer buffer 125 based on clearance window 312. For example, load/store unit 330 can execute process 700 described above. Although not shown in FIG. 8, window-defining logic 310 can operate in each cycle to update the window parameters defining clearance window 312. As the window parameters are updated, different instructions in load/store issue queue 302 can enter clearance window 312 and become cleared to allocate space in vector transfer buffer 125. At block 836, load/store unit 330 can identify one or more instructions in load/store issue queue 302 that are ready for issue. As described above, in the case of a vector load, being ready for issue includes being cleared to allocate space in vector transfer buffer 125. Other conditions, such as a requested memory resource being available and cleared of data hazards, can also apply, and the particular conditions may depend on the type of instruction. At block 838, load/store unit 330 can issue (or begin execution of) one or more instructions that have been identified as ready for issue. In some embodiments, load/store unit 330 can issue multiple instructions per cycle (e.g., multiple instructions that read from compatible memory locations or instructions that read and write compatible memory locations).

Processing block 820 can include adding a dispatched instruction to vector issue queue 222 at block 822. In this example, instructions in vector issue queue 222 are issued in order. Accordingly, at block 824, issue logic in vector domain 120 selects the oldest instruction in vector issue queue 222, and at block 826, vector domain 120 issues (or begins execution of) the oldest instruction if its required resources are available. In the case of vector load instructions, resources required for issue include data being ready in vector transfer buffer 125. In some embodiments, multiple instructions per cycle can be issued from vector issue queue 222. (For instance, vector domain 120 can support superscalar issue of vector instructions that are executed by different vector execution units.)

It will be appreciated that process 800 is illustrative and can be modified. The processing operations shown can occur concurrently in different logic circuits during a processing cycle and can be repeated for each processing cycle. It should be understood that the instructions can include any sequence of instructions and any combination of instructions supported by a particular processor; load and store instructions (including vector load instructions and vector store instructions) can be interleaved in the program instruction sequence with other instructions, such as arithmetic instructions, control flow instructions, and other types of instructions. A processor can include any number of processing units, each of which can have its own issue queue, and a single dispatch unit can dispatch instructions to any processing unit, with the destination processing unit(s) being selected by the dispatch unit based on the particular instruction being dispatched. Different processing units can implement different logic to determine when to issue instructions from their issue queues; issue can be scalar or superscalar, in-order or out-of-order, depending on the particular processing unit. In some embodiments, instructions that are issued in order may finish execution out of order. As described above, a retirement unit 145 can be provided to create the appearance of in-order execution.

Figure 9A:
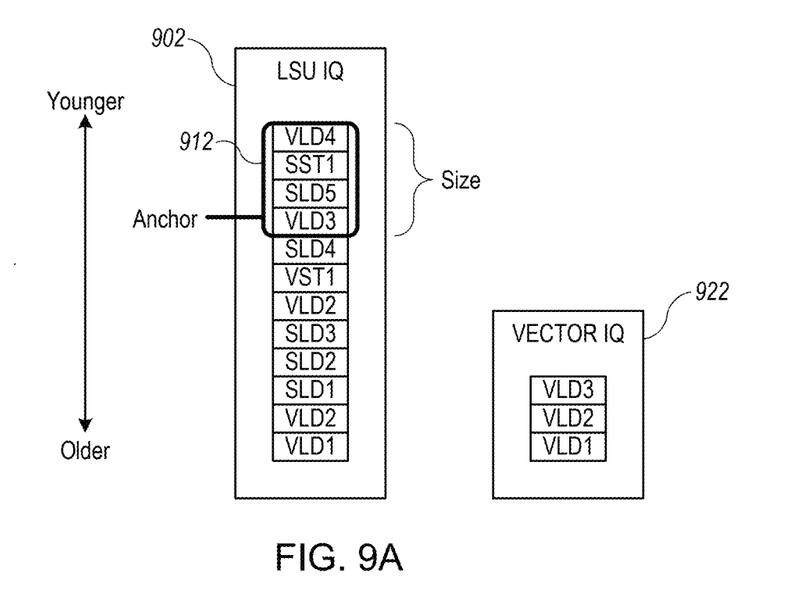
FIGS. 9A and 9B further illustrate an effect of window-based constraint of vector transfer buffer allocation according to some embodiments.
Figure 9B:
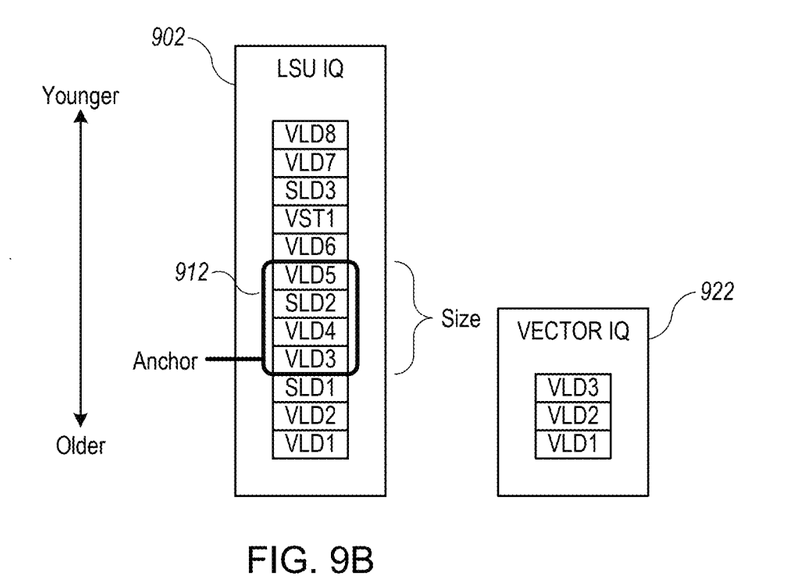

FIGS. 9A and 9B further illustrate an effect of window-based constraint of vector load instruction issue according to some embodiments. FIG. 9A shows an illustration of a set of instructions in load/store issue queue 902 and in vector issue queue 922 at a given point in time. "VLD" denotes a vector load, "SLD" denotes a scalar load, "VST" denotes a vector store, and "SST" denotes a scalar store. The numerical suffix distinguishes different instructions of the same type. Older (younger) instructions are toward the bottom (top), as indicated by arrow 901.

In this example, the anchor point for clearance window 912 is defined by the youngest vector load instruction that has been dispatched to vector issue queue 922, which is VLD3. For convenience of illustration, the window size is assumed to be fixed at four instructions. Any vector load instruction that is in clearance window 912 or older than the anchor point (VLD3) is cleared to allocate space in the vector transfer buffer (e.g., in accordance with process 700). In this case, clearance window 912 extends to the oldest instruction in load/store issue queue 902, and every vector load instruction in load/store issue queue 902 is cleared to allocate space in the vector transfer buffer.

FIG. 9B shows an illustration of a different set of instructions in load/store issue queue 902 and in vector issue queue 922 at a given cycle. The set of instructions in FIG. 9B has higher density of vector loads than the set of instructions in FIG. 9A. As in FIG. 9A, the anchor point for clearance window 912 is defined by the youngest vector instruction that has been dispatched to vector issue queue 922, which is VLD3. For convenience of illustration, the window size is assumed to be fixed at four instructions. Any vector load instruction that is in clearance window 912 or older than the anchor point is cleared to allocate space in the vector transfer buffer (e.g., in accordance with process 700). That is, any of VLD1, VLD2, VLD3, VLD4, or VLD5 can allocate space in the vector transfer buffer. VLD6, VLD7, and VLD8 are younger than clearance window 912 and therefore are not cleared to allocate space in the vector buffer (e.g., in accordance with process 700). Accordingly, VLD6, VLD7, and VLD8 are blocked from being issued in the current cycle. Instructions other than vector load instructions that are younger than the cutoff imposed by clearance window 912, such as VST1 and SLD3, can be issued, assuming they are ready, as they do not use the vector transfer buffer. This example illustrates how the effect of the constraint imposed by clearance window 912 can be different from simply limiting the size of load/store issue queue 902.

It should be understood that all of the foregoing examples are illustrative and that variations and modifications are possible. The particular definition of the clearance window that determines which vector load instructions are cleared to allocate space in the vector transfer buffer can be modified, e.g., using different algorithms to determine the anchor point and window size. As noted above, the definition of the window involves design tradeoffs. For instance, a larger window may allow for greater efficiency by increasing the options for out-of-order loads but may also entail a larger vector transfer buffer to avoid deadlock.

Further, embodiments of the invention are not limited to the particular context of vector load instructions. It should be noted that a data path for a vector store instruction may also include a vector transfer buffer; however, data flow is in the opposite direction, with the vector domain storing data into the vector transfer buffer and the load/store unit reading the data from the vector transfer buffer. In embodiments where the same physical vector transfer buffer is used to support both vector load and vector store, it may be desirable to constrain the window for vector loads so that at least some space in the vector transfer buffer remains available to receive data for vector stores. Alternatively, separate vector transfer buffers (or separate sections in a single buffer) can be dedicated to vector loads and vector stores.

Those skilled in the art with the benefit of this disclosure will also appreciate that similar design principles can be applied to construct embodiments of issue logic that avoids deadlock in other situation where a shared resource (such as a transfer buffer between register renaming domains) is allocated out-of-order by one unit in a processor (e.g., a load/store unit) and freed in-order by another unit (e.g., a vector transfer pipe in a vector domain). A window-based constraint on issue order as described herein may be particularly effective in situations where the unit that allocates the shared resource also handles other types of operations that do not involve the shared resource.

Additional Embodiments

While the invention has been described with reference to specific embodiments, those skilled in the art will appreciate that variations and modifications are possible. For instance, various design parameters including the size of the transfer buffer, sizes of issue queues, window parameters (e.g., anchor point and size), and the like can all be modified. Examples described herein make specific reference to RISC-V standards; however, embodiments are not limited to any particular instruction set architecture or other standards.

While various circuits and components are described herein with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Components described as dedicated or fixed-function circuits can be configured to perform operations by providing a suitable arrangement of circuit components (e.g., logic gates, registers, switches, etc.); automated design tools can be used to generate appropriate arrangements of circuit components implementing operations described herein. Components described as processors, microprocessors, coprocessors or the like can be configured to perform operations described herein by providing suitable program code. Various blocks might or might not be reconfigurable depending on how the initial configuration is obtained. Embodiments of the present invention can be realized in a variety of apparatus including electronic devices implemented using a combination of circuitry and software.

All processes described herein are also illustrative and can be modified. Operations can be performed in a different order from that described, to the extent that logic permits; operations described above may be omitted or combined; and operations not expressly described above may be added.

Computer programs incorporating features of the present invention that can be implemented using program code may be encoded and stored on various computer readable storage media; suitable media include magnetic disk or tape, optical storage media such as compact disk (CD) or DVD (digital versatile disk), flash memory, and other non-transitory media. In some instances, program code can be supplied via Internet download or other (transitory) signal transmission.

All numerical values and ranges provided herein are illustrative and may be modified. Unless otherwise indicated, drawings should be understood as schematic and not to scale.

Accordingly, although the invention has been described with respect to specific embodiments, it will be appreciated that the invention is intended to cover all modifications and equivalents within the scope of the following claims.

What is claimed is:

1. A method comprising:
   receiving, in a dispatch unit of a processor, a sequence of instructions having a program order, wherein at least some of the instructions are vector load instructions to load data from a memory system into a vector register file of the processor;
   dispatching the instructions from the dispatch unit to a plurality of issue queues in the processor, wherein dispatching the instructions includes dispatching each vector load instruction to a load/store issue queue of a load/store unit of the processor and to a vector issue queue in a vector domain of the processor;
   determining, by the load/store unit, whether each vector load instruction in the load/store issue queue is ready for issue, the determination including a constraint that the vector load instruction is within or younger than a clearance window defined within the load/store issue queue, wherein the clearance window is defined to allow at least some of the vector load instructions to be executed by the load/store unit out of the program order with respect to each other;
   executing, by the load/store unit, instructions from the load/store issue queue in an order different from the program order, wherein execution of the vector load instruction by the load/store unit occurs while the vector load instruction is ready for execution and wherein executing the vector load instruction by the load/store unit includes allocating a space in a vector transfer buffer and loading data from memory into the allocated space in the vector transfer buffer; and
   executing, in the vector domain of the processor, instructions from the vector issue queue in the program order, wherein execution of the vector load instruction in the vector domain includes transferring data from the allocated space in the vector transfer buffer to a destination register in the vector register file.

2. The method of claim 1 wherein the clearance window is further defined such that space in the vector transfer buffer is available for allocation by an oldest vector load instruction in the load/store issue queue.

3. The method of claim 1 further comprising:
   determining, using window logic in the processor, window parameters for the clearance window, the window parameters including a dynamically determined anchor point and a window size.

4. The method of claim 3 wherein the anchor point is dynamically determined based on identifying a youngest instruction in the vector issue queue.

5. The method of claim 3 wherein the instructions are arranged in a plurality of retirement groups according to the program order and wherein the anchor point is dynamically determined based on identifying a youngest retirement group of instructions that includes a vector load instruction.

6. The method of claim 5 wherein the window size is a static parameter corresponding to a fixed number of retirement groups.

7. The method of claim 3 wherein the window size is dynamically determined based at least in part on a length of a data vector, wherein the length of the data vector is a runtime-configurable parameter.

8. The method of claim 3 wherein the window size is dynamically determined dynamically based at least in part on estimating a density of vector load instructions in the sequence of instructions.

9. The method of claim 3 wherein the window size is determined dynamically based at least in part on a current fill level of the vector transfer buffer.

10. The method of claim 1 wherein instructions in the load/store issue queue other than vector load instructions are executed without regard to the clearance window.

11. A processor comprising:
   a vector domain including a vector issue queue, a vector data transfer pipe, and a vector register file, wherein the vector issue queue is configured to issue instructions in order;
   a load/store unit including a load/store issue queue, wherein the load/store issue queue is configured to issue instructions out of order;
   a vector transfer buffer configured to store vector data;
   a dispatch unit configured to:
      receive a sequence of instructions having a program order, wherein at least some of the instructions are vector load instructions to load data from a memory system into a vector register file of the processor; and
      dispatch the instructions to a plurality of issue queues in the processor, wherein dispatching the instructions includes dispatching each vector load instruction to the load/store issue queue and to the vector issue queue; and
   window-defining logic configured to define a clearance window in the load/store issue queue, wherein the clearance window is defined to allow at least some of the vector load instructions to be executed by the load/store unit out of the program order with respect to each other,
   wherein the load/store unit is configured such that executing a particular vector load instruction includes allocating space in the vector transfer buffer and loading vector data from a memory system into the allocated space in the vector transfer buffer,
   wherein the vector data transfer pipe is configured such that executing the particular vector load instruction includes transferring the vector data from the allocated space in the vector transfer buffer to the vector register file, and
   wherein the load/store unit further includes window-constrained issue logic configured to determine whether each vector load instruction in the load/store issue queue is ready for issue, the determination including a constraint that the vector load instruction is within or younger than the clearance window.

12. The processor of claim 11 wherein the window-defining logic is further configured to define the clearance window such that space in the vector transfer buffer is available for allocation by an oldest vector load instruction in the load/store issue queue.

13. The processor of claim 11 wherein the window-defining logic is further configured to define window parameters for the clearance window, the window parameters including a dynamically determined anchor point and a window size.

14. The processor of claim 13 wherein the window-defining logic is further configured to dynamically determine the anchor point based on identifying a youngest instruction in the vector issue queue.

15. The processor of claim 13 further comprising:
a reorder buffer configured to arrange the instructions in a plurality of retirement groups according to the program order,
wherein the window-defining logic is further configured to dynamically determine the anchor point based on identifying a youngest retirement group of instructions that includes a vector load instruction.

16. The processor of claim 15 wherein the window-defining logic is further configured window size is a static parameter corresponding to a fixed number of retirement groups.

17. The processor of claim 13 wherein the window-defining logic is further configured to dynamically determine the window size based at least in part on a length of a data vector, wherein the length of the data vector is a runtime-configurable parameter.

18. The processor of claim 13 wherein the window-defining logic is further configured to dynamically determine the window size based at least in part on estimating a density of vector load instructions in the sequence of instructions.

19. The processor of claim 13 wherein the window-defining logic is further configured to dynamically determine the window size based at least in part on a current fill level of the vector transfer buffer.

20. The processor of claim 11 wherein the window-constrained issue logic in the load/store unit is further configured such that instructions in the load/store issue queue other than vector load instructions are issued without regard to the clearance window.

* * * * *